US006381627B1

(12) United States Patent
Kwan et al.

(10) Patent No.: US 6,381,627 B1
(45) Date of Patent: Apr. 30, 2002

(54) METHOD AND COMPUTER READABLE MEDIUM FOR DISCOVERING MASTER DNS SERVER COMPUTERS FOR A GIVEN DOMAIN NAME IN MULTIPLE MASTER AND MULTIPLE NAMESPACE CONFIGURATIONS

(75) Inventors: Stuart Lup-Sing Kwan; Glenn Alexander Curtis, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,770

(22) Filed: Sep. 21, 1998

(51) Int. Cl.[7] .............................................. G06F 15/16
(52) U.S. Cl. ....................... 709/201; 709/220; 709/245; 707/10
(58) Field of Search ................................. 709/201, 245, 709/220, 208; 707/10, 104

(56) References Cited

U.S. PATENT DOCUMENTS

| | | | | |
|---|---|---|---|---|
| 5,410,691 A | * | 4/1995 | Taylor | 340/825.02 |
| 5,459,863 A | * | 10/1995 | Taylor | 707/10 |
| 5,608,903 A | * | 3/1997 | Prasad et al. | 707/10 |
| 5,664,170 A | * | 9/1997 | Taylor | 707/102 |
| 5,842,214 A | * | 11/1998 | Whitney et al. | 707/1 |
| 5,884,322 A | * | 3/1999 | Sidhu et al. | 707/10 |
| 6,081,896 A | * | 6/2000 | Miller et al. | 707/10 |
| 6,092,189 A | * | 7/2000 | Fisher et al. | 713/1 |
| 6,202,070 B1 | * | 3/2001 | Nguyen et al. | 707/10 |
| 6,324,571 B1 | * | 11/2001 | Hacherl | 705/9 |

OTHER PUBLICATIONS

Elz, R., *Clarifications to the DNS Specification*, RFC 2181; pp. 1–14; Jul. 1997.
Kessler, Gary, *Setting Up Your Own DNS*, p. 1–10; http://www.hill.com/library/dns.html; Mar. 1996.

(List continued on next page.)

Primary Examiner—Mehmet B. Geckil
(74) Attorney, Agent, or Firm—Workman, Nydegger, Seeley (57) ABSTRACT

The invention detects multiple master DNS server computers and handles multiple namespaces. In traditional DNS, each zone or domain has a primary or master server computer as well as one or more slave server computers. Both the master server computer and the slave server computers have complete information regarding a particular zone. The master server computer is distinct in that it receives changes made by a client. The slave server computers periodically update their own information from the master server computer. In multiple master DNS, each server computer is essentially a primary server computer in that any server computer may accept updates from a client. This information is then distributed to the other multiple master server computers. In order to determine whether a server computer is a multiple master server computer an analysis must be has as to the SOA record, which contains the name of the primary server computer as well as the zone for which the primary server computer is authoritative, and the NS record set, which holds the names of all server computers. The analysis of these records determines which server computers are multiple master DNS server computers. A client, by knowing which server computers are multiple master server computers, may send an update to any one of those server computers. A client is thus not limited to one server computer, which could be down or otherwise not functioning. In multiple master server computer configurations, a client has a choice as to where to send an update. The present invention also determines how many namespaces the client is in. This is also done by examining the SOA and NS record sets. While a client may be physically connected to one or more networks, the networks may in reality be in the same namespace. The invention determines the number of namespaces. When a client is prepared to update information contained in the network or on a server computer, the client need only update each namespace rather than send an update over each network connection.

38 Claims, 4 Drawing Sheets

Mockapetris, P., *Domain Names—Concepts and Facilities;* RFC 1034; pp. 1–49, Nov. 1987.

Mockapetris, P., *Domain Names—Implementation and Specification,* RFC 1035; pp. 1–49, Nov. 1987.

Vixie, P., et al, *Dynamic Updates in the Domain Name System* (DNS UPDATE); RFC 2136; pp. 1–24; Apr. 1997.

"*Windows NT Server: Dynamic Host Configuration Protocol and Windows Internet Naming Service*"; pp. 1–21; http://premium.microsoft.com/msdn/library/backgrnd/html/msdn_dhcpwins.htm; Aug. 19, 1994; Copyright 1998 Microsoft Corporation.

* cited by examiner

METHOD AND COMPUTER READABLE MEDIUM FOR DISCOVERING MASTER DNS SERVER COMPUTERS FOR A GIVEN DOMAIN NAME IN MULTIPLE MASTER AND MULTIPLE NAMESPACE CONFIGURATIONS

BACKGROUND OF THE INVENTION

1. The Field of the Invention

The present invention relates to computer networks and a system for discovery of Master Server Computers in the Domain Naming System (DNS). More particularly, the invention is related to finding these server computers in an environment that consists of multiple namespaces and multiple master DNS servers.

2. The Prior State of the Art

Increasingly, client computer-server computer computing has become a normal trend for the delivery of computational services. A server computer will have a desired application and a client computer will have software component capable of accessing the server computer for the desired services. This may take place over a communications network, such as an Ethernet Local Area Network ("LAN"), or it may occur over a more direct connection through a modem. In either case, the bulk of the computing is provided by the server computer or server computer application and the results are communicated to the client computer portion or client computer application that will then display the results for the user.

It becomes a somewhat difficult process in many instances to anticipate adequate resources for running the server computer application for a certain level of load created by a particular number of users desiring the services provided by the server computer application. The resources used are typically hardware resources, such as CPU time, network bandwidth, disk and memory usage, etc., but may also include software component resources, such as operating system facility usage.

It is important to anticipate adequate resources for the server computer application in order to reduce frustration on the part of the user and to allow the client computer-server computer software component to work most effectively. One of the most common user frustrations is having an unusually long delay in receiving the results of the services provided by the service application or simply not having the server computer application available to provide the desired services, both due to inadequate hardware and system resources. Furthermore, actual errors in the services provided may occur due to the lack of resources available for running the server computer application.

Increasingly, client computers and server computers are standardizing in the way that they communicate, particularly in view of the advances in use and exploitation of the Internet. Of the many areas of standardization, one example is in Internet machine addressing protocol, which is directed towards the reality that computers and people don't remember address information in the same way. While people remember address names with words, computers remember and store information, including address names, numerically. To help people and computers communicate, a translation program is need to translate address names expressed in words into address names expressed in numbers, and vice a versa. In order for a computer to find a specific resource on the Internet, such as a document, a Universal Resource Locator (URL) is used as the address for the document. A person wanting to locate the document enters the words of the URL on a computer that is in communication with the Internet. The computer identifies server computers, including itself, with an IP address that is numerically expressed.

The Microsoft Corporation has in the past produced computer networking software components that perform the registration of IP addresses using the Windows Internet Naming Service (WINS). WINS could be used to translate names expressed in words into names expressed in numbers, and vice a versa. In this way, WINS could be used to use to automatically publish machine name IP addresses. Translation software fundamentally is used to translate text names of server computers into the numeric names that computers recognize, which is then published as IP addresses so that server computers located on geographically disbursed computer networks, such as the Internet, can find one another.

The WINS server computer method is a method for automatic registration of machine host names and IP addresses that is handled through a WINS protocol and server computer. As a machine gets a new IP address, the address information is put on a WINS server computer. When the database of a WINS server computer is relatively small, the WINS server computer is relatively easy to use and maintain. The WINS server computer, however, is disadvantaged in that it does not scale very well since the namespace of the database thereof is flat and cannot be partitioned.

A more common server computer than a WINS server computer is a Domain Naming System (DNS) server computer. DNS is a general-purpose distributed database for storing of DNS data that is published by software entities. Although there are many uses for a DNS system and the general-purpose nature of the DNS database, such as its use as a mechanism for client-server rendezvous, one popular use is "name to address translation", or the act of converting human-friendly names into machine-friendly addresses. DNS is also used for address-to-name translation of the taking of an IP address and finding out the name associated with it. Computers and other resources having an Internet presence use DNS to provide a textually expressed name. In addition to the responsibility of DNS for converting machine names into IP addresses and vice versa, DNS also coordinates IP addressing in the vast and distributed database that is representative of all published machines.

WINS differs from standard DNS in two significant ways. Standard DNS information for a particular domain is configured through static configuration files. That is, the files must be updated by hand for the most part. The standard WINS information database is built dynamically without human intervention, although static records can also be added to the WINS database by manually entry. A WINS client computer will register its name with the WINS server computer when it boots. As long as the name is not already in use, the WINS server computer will allow the client computer to use that name.

WINS and DNS interface in a methodology knows as WINS Referral that functions on DNS server computers. In WINS Referral, queries are made by a client computer for a name and if the name is not found in the DNS database, then the query is referred instead to WINS. The WINS Referral methodology then determines if the queried name is in WINS or not. If the queried name is found in WINS, then the answer to the query is returned first back to DNS and then back to the client.

WINS and standard DNS are used to resolve different types of services. DNS is used to resolve service types like HTTP for web access, or FTP for file transfer, or POP for mail transfer, or TELNET for terminal access. WINS name resolution is used to resolve names of NETBIOS services. Some NETBIOS services include, for example, the ability to share directories and printers.

One of the many goals of DNS is to provide access to DNS data that is useable by computers connected on networks, called hosts. The terms host and client computer are used interchangeably herein. One example of this goal is the DNS mechanism for naming resources in such a way that the names are usable in different hosts, networks, protocol families, Internet, and administrative organizations.

The DNS distributed general-purpose database is partitioned into zones. A DNS server hosts each zone. In general, no single DNS server holds a copy of the entire DNS database. The database consists of records, where each record has five parts. The five parts of each DNS record are the Name, Time To Live, Class, Type, and Data. For the purposes of this present application, only the Name, the Type and the Data will be discussed. The Names in the DNS records form a hierarchy or tree. An example record type is the Host record, which is an "A record". The Name corresponds to the name of a host on the network, and the Data corresponds to the IP address of that host.

A record set consists of all the records for a given Name and Type. For example, the "A record set" for a given host name consists of all the IP addresses associated with that host, where there is one "A record" per IP address.

A DNS server may load one or more zones, and a DNS server that loads a zone is said to be Authoritative for the names in that zone. A zone may be copied to one or more servers for fault tolerance and load balancing. The act of replicating a zone from one server to another is called Zone Transfer. A single copy of the zone is identified as the Master copy of the zone, and all subsequent copies of the zone are Slave copies. Changes to the zone can only be made on the DNS server that holds the Master copy of the zone. There are some configurations, however, where there may be more than one Master copy of a given zone, as is discussed below.

The "top" or beginning of a zone is indicated by a Start of Authority ("SOA record") record. The Name of the SOA record is the name of the zone. The Data of the SOA record includes the DNS name of the master server for the zone and a serial number value that indicates the current version of the zone. One or more Name Server ("NS record") records of the same Name always accompany an SOA record. The Data of the NS records includes the names of all the servers that are authoritative for the zone.

There are three major components of the DNS system including the Domain Name Space, Resource Records, Name servers, and Resolvers. The Domain Name Space and Resource Records are specifications for a tree structured name space and data associated with the names. Conceptually, each node and leaf of the Domain Name Space tree names a set of information, and query operations are attempts to extract specific types of information from a particular set of information. A query names the domain name of interest and describes the type of resource information that is desired. For example, the Internet uses some of its domain names to identify hosts. Queries for address resources return Internet host addresses. The Domain Name Space is a tree structure. Each node and leaf on the tree corresponds to a resource set. The domain name of a node is the list of the labels on the path from the node to the root of the tree. All domain names end at the root. A domain name has labels that are separated by dots ("."). A complete domain name ends with the root label. A domain is identified by a domain name, and consists of that part of the domain name space that is at or below the domain name, which specifies the domain. A domain is a subdomain of another domain if it is contained within that domain. A domain name identifies a node. Each node has a set of resource information, which may be empty.

Name servers are server computer software components that hold information about the domain tree's structure and set information. Stated otherwise, name servers are the repositories of information that make up the domain database. As mentioned above, the DNS database is partitioned into zones, each of which is hosted by a DNS server computer. The zones are distributed among the name servers. The essential task of a name server is to answer queries using data in its zones. Name servers can answer queries in a simple manner. The response can always be generated using only local data, and either contains the answer to the question or a referral to other name servers "closer" to the desired information. Name servers manage data that is held in zones. Each zone is the complete database for a particular "pruned" subtree of the domain space. This data is called Authoritative. In contrast, a DNS server that loads the zone is said to be Authoritative for the names in that zone. A name server periodically checks to make sure that its zones are up to date, and if not, obtains a new copy of updated zones from master files stored locally or in another name server.

Figure 1:
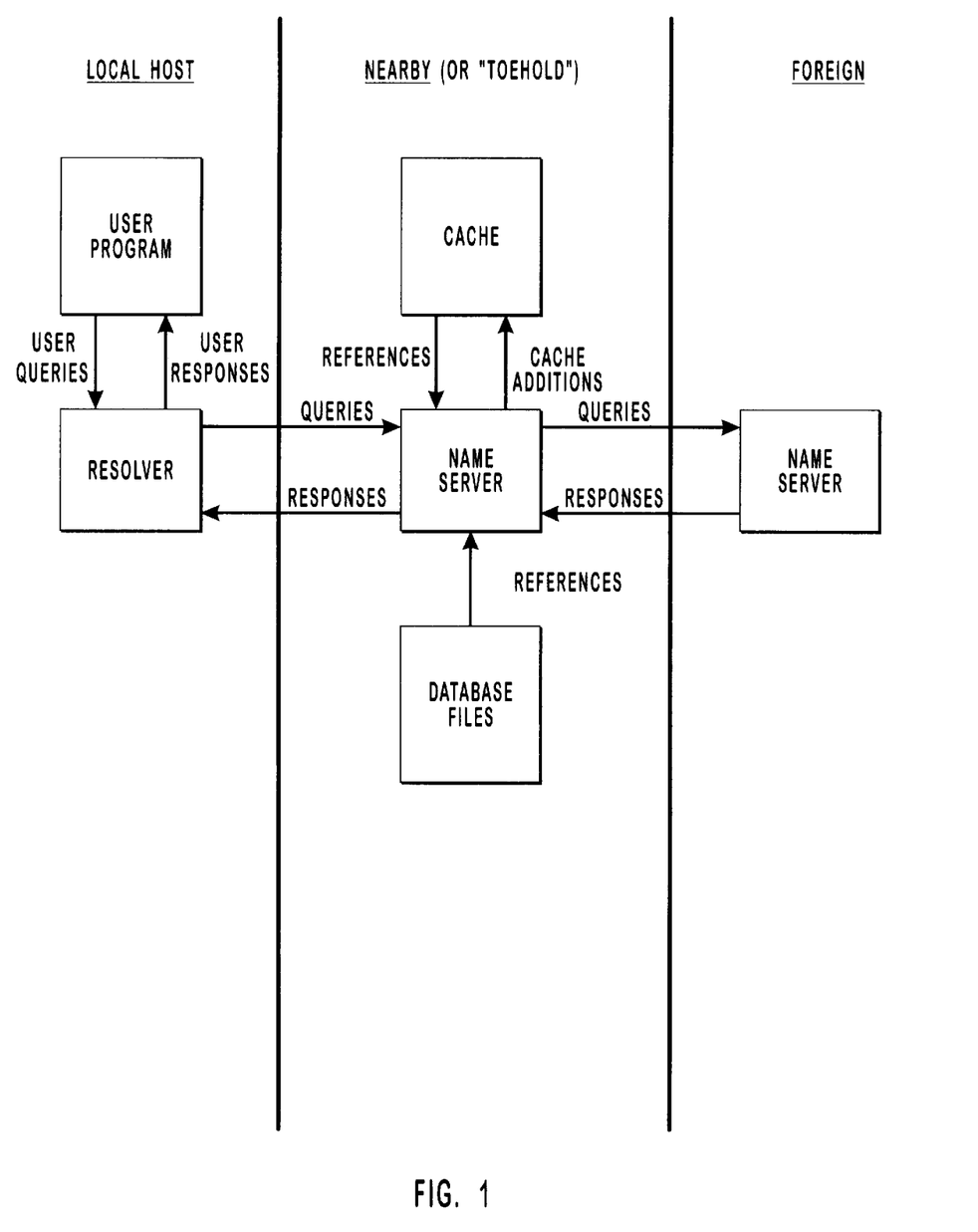
FIG. 1 is a block diagram showing the environment and interfacing of a common DNS configuration as existing in the prior art in which user programs interact with the domain name space through resolvers in the domain name system, where a shared database holds domain space data for a local name server and its resolver.

A host can participate in the domain name system in a number of ways, depending on whether the host runs programs that retrieve information from the domain system, name servers that answer queries from other hosts, or various combinations of both functions. A common DNS configuration is seen in FIG. 1 in which user programs interact with the domain name space through resolvers. From the user's point of view, domain names are useful as arguments to a local agent, which called a resolver, which retrieves information associated with the domain name. Thus a user might ask for the host address by an appropriate query type that is then passed to the resolver with the domain name. To the user, the domain tree is a single information space.

The information flow shown in FIG. 1 illustrates a host supporting various aspects of the domain name system, where a cache holds domain space data for the nearby or "toehold" name server and the local resolver. As is illustrated in FIG. 1, the DNS system is constructed of three parts: a resolver, a "toehold" DNS server, and one or more foreign DNS servers. The resolver associated with a local host store the IP addresses of one or more "toehold" DNS servers, where typically the toehold server is nearby in a communications network or physical sense. The resolver then send queries to the toehold server for which the resolver has an IP address, and the toehold servers answers the query from its authoritative data, or out of its associated cache, or by recursively querying one or more foreign servers for an answer to the query. The contents of the cache will typically be a mixture of authoritative data maintained by the periodic refresh operations of the name server from previous resolver requests. The structure of the domain data and the necessity for synchronization between name servers and resolvers imply the general characteristics of the cache.

The format of user queries and user responses is specific to the host and its operating system. User queries will typically be operating system calls, and the resolver will be part of the host operating system. Less capable hosts may choose to implement the resolver as a software component subroutine to be linked in with every software component that needs its services.

A local resolver, which is illustrated by way of example in FIG. 1, is a software component that extracts information from name servers in response to client computer requests. A resolver must be able to access at least one name server and use that name server's information to answer a query directly, or pursue the query using referrals to other name servers. From the resolver's point of view, the database that makes up the domain space is distributed among various name servers. The resolver starts with knowledge of at least one name server. When the resolver processes a user query it asks a known name server for the information. In return, the resolver either receives the desired information or a referral to another name server.

Resolvers answer user queries with information they acquire via queries to foreign name servers. The resolver may have to make several queries to several different foreign name servers to answer a particular user query, and hence the resolution of a user query may involve several network accesses and an arbitrary amount of time. The queries to foreign name servers and the corresponding responses have a DNS standard format.

Depending on its capabilities, a name server could be a stand-alone program on a dedicated machine or a process or processes on a large timeshared host. As seen in FIG. 1, a primary name server acquires information about one or more zones by reading zone files from its local file system, and answers queries about those zones that arrive from foreign resolvers.

The DNS allows that zones be redundantly supported by more than one name server. Designated secondary servers can acquire zones and check for updates from the primary server using the zone transfer protocol of the DNS. In FIG. 1, the name server periodically establishes a virtual circuit to a foreign name server to acquire a copy of a zone or to check that an existing copy has not changed. The messages sent by messaging for these maintenance activities follow the same form as queries and responses, but the message sequences are somewhat different.

In general, a network administrator is charged with maintaining a database. In the task of manually maintaining a zone by a network administrator, part of the job is to maintain the zones at all of the name servers which are authoritative for the zone. When the inevitable changes are made, they must be distributed to all of the name servers. Stated otherwise, a change must be distributed to all servers that load the zone affected by the change.

The general model of automatic zone transfer or refreshing is that one of the name servers is the master or primary for the zone. Changes are coordinated at the primary name server, typically by editing a master file for the zone. After editing, the administrator signals the master server computer to load the new zone. The other non-master or secondary server computers for the zone periodically check for changes, at a selectable interval, and obtain new zone copies when changes have been made.

To detect changes, secondary servers just check a serial number of the SOA for the zone. The serial number in the SOA of the zone is always advanced whenever any change is made to the zone. The purpose is to make it possible to determine which of two copies of a zone is more recent by comparing serial numbers. If the serial field in the secondary server's zone copy is equal to the serial returned by the primary, then no changes have occurred. When the poll shows that the zone has changed, then the secondary server computer must request a zone transfer via a request for the zone. The request is answered by a sequence of response messages. The first and last messages must contain the data for the top authoritative node of the zone. Intermediate messages carry all of the other record sets from the zone, including both authoritative and non-authoritative record sets. The stream of messages allows the secondary server computer to construct a copy of the zone.

In DNS, a given name server will typically support one or more zones, but this gives it authoritative information about only a small section of the domain tree. The name server marks its responses to queries so that the requester can tell whether the response comes from authoritative data or not. A particular name server has complete information about a subset of the domain space, and pointers to other name servers that can be used to lead to from any part of the domain tree. Name servers know the parts of the domain tree for which they have complete information. From a name server's point of view, the domain system consists of zones that are separate sets of local information. The name server has local copies of some of the zones. The name server must periodically refresh its zones from master copies in local files or foreign name servers. The name server must concurrently process queries that arrive from resolvers.

The authoritative server computers for a zone are enumerated in the NS records for the origin of the zone, which, along with a SOA record are the mandatory records in every zone. Such a server computer is authoritative for all resource records in a zone that are not in another zone. A server computer for a zone should not return authoritative answers for queries related to names in another zone unless it also happens to be a server computer for the other zone.

DNS has been designed such that a consistent name space is used for referring to resources. All DNS data associated with a name is tagged with a type and queries can be limited to a single type or can be directed to retrieve all types for a given name. Query operations, as discussed above, are initiated by queries. Queries are messages which may be sent by messaging to a name server to provoke a response. The response by the name server either answers the question posed in the query, refers the requester to another set of name servers, or signals some error condition.

Traditionally, records in a DNS database of a DNS server computer were manually configured through editing of zone files. Then, the Zone Transfer mechanism was used to replicate zones between server computers. As such, entry of data could be at only one location. This type of manual entry is generally too intense in that DNS data that changes often is hard to manage and inefficient because it involved editing a file directly and reloading the server. A more efficient method would involve a method in the protocol itself for dynamically updating the database. Of the many examples of data in a DNS database that can be published dynamically, one example is IP addresses in the DNS database.

As used herein, the term "RFC 1034" refers to the Network Working Group Request For Comments No. 1034 titled "Domain Names—Concepts and Facilities", published by Information Sciences Institute (ISI) of the University of Southern California in November, 1987, which is incorporated herein by reference.

As used herein, the term "RFC 1035" refers to the Network Working Group Request For Comments No. 1035 titled "Domain Names—Implementation and Specification" published by published by Information Sciences Institute (ISI) of the University of Southern California in November, 1987, which is incorporated herein by reference.

As used herein, the term "RFC 1995" refers to the Network Working Group Request For Comments No. 1995 titled "Incremental Zone Transfer" authored by M. Ohta of the Tokyo Institute of Technology and published in August 1996, which is incorporated herein by reference.

As used herein, the term "RFC 2136" refers to the Network Working Group Request For Comments No. 2136 titled "Dynamic Updates in the Domain Name System (DNS UPDATE)", category: Standards Track, edited by P. Vixie, and authored by S. Thomson, Y. Rekhter, and J. Bound, and published in April, 1997, which is incorporated herein by reference.

Internet Protocols RFCs 1034 and 1035, as modified by RFC 2136, indicate a way in which DNS entries can be updated dynamically. The Internet Protocol RFC 2136 describes an on-the-wire protocol for being able to send updates to a particular server computer. Using RFC 2136, it is possible to add or delete data from a specified zone, such as IP address records. In RFC 2136, messages can be transmitted in messaging routine, such as an update message. Some messages can have prerequisites while other messages need not have prerequisites. When an update message does contain a prerequisite, an update is not made to a zone until the prerequisite is first met, i.e., all prerequisites must be satisfied or else no update operations will take place. A prerequisite is a messaging component that is sent from a client computer to another server computer that does not contain an update to the zone, but rather examines a record or record set of any type whose name falls within the zone. One such examination of the prerequisite component is that of the IP address records held by the server computer. The prerequisite can ask the previous existence or non-existence within the server computer's database of one or more names or record sets.

The current implementation of the DNS database, as set forth above, relies on a primary server that is backed up with slave servers. When a client desires to update a zone or a domain, the update must be sent to the primary server. The slave servers, at regular intervals, check the primary server to determine if any of the zones have changed. If a zone has changed, then the process of zone transfer is initiated. Under the current implementation of DNS, the primary or master server is authoritative for the information in a zone. The other or slave servers are also authoritative for the same zone. The difference is that only the master or primary server is capable of accepting updates from a client. The slave servers will ultimately have this information, but only after receiving it from the primary server.

The DNS database may also be configured such that there may be more than one master copy of a given zone. This configuration is called multimaster DNS. In multimaster DNS, there can be more than one DNS server loading a particular zone and being authoritative for that zone. Each of the multimaster DNS servers loading a particular zone will be able to commit updates from a client. This is distinct from traditional DNS, where all DNS servers, including slave servers can receive updates, but only the master server can commit an update. This information, once one multimaster server has received it, is distributed to the other multimaster servers in the zone. Each of the master servers for a zone in a multimaster configuration utilizes a replication scheme to keep the changes to the zone consistent among each of the master servers. It would be useful for a client to know if the DNS servers in a particular zone are multimaster DNS servers. If one multimaster DNS server is down or unavailable, the client can simply send the update to another multimaster DNS server, rather than, in the current implementation of DNS, wait for the primary server to be up again. Detection of multimaster DNS servers would enhance the client's ability keep up-to-date information available to other sources In some environments, a client may have more than one network connection. A client can be connected to many different DNS servers. If these servers are connected or in the same DNS namespace, it would be useful for the client to know this information. If the distinct network connections are connected to networks that are in a single namespace, then only one update need be sent. This is true of current DNS as well as multimaster DNS. When a client needs to update information to a DNS server, it is desirable that the client would only need to send one update to each namespace. The DNS server, whether it is a primary server under current DNS, or a multimaster DNS server, would be able to deliver this information to the other zone servers. A client sending an update via each network connection could possibly be redundant, depending on the number of namespaces to which a client is connected. As such, it is desirable to reduce network traffic by reducing the number of updates sent over a network so as to decrease bandwidth use.

SUMMARY OF THE INVENTION

The invention is useful in the presence of single and multiple network connections to determine if the namespaces represented by each network connection should be treated as one namespace or as disjoint namespaces. When two namespaces are disjoint, they do not share the same master zone file data in DNS. This can be true even if the zone names are the same. When a host desires to publish information to the DNS database, the host must publish to each separate namespace. Properly updating DNS record data is useful to not only the host but also to others who desire to know and use the published information. Also, determining the number of namespaces represented by all network connections can reduce the amount of network update traffic, as an update will be sent to each namespace rather than over each network connection.

The present invention also detects the existence of multimaster DNS servers. For a host that is connected within one or more networks, a test is used to determine whether a particular server for a particular zone is a traditional DNS server or a multimaster DNS server. The test examines at least one server in each network that the host is connected within. In order to determine that the particular server is a multimaster DNS server, at least one other DNS server that is a master server for that particular zone must be found. If no other DNS server is found that is a master server for that particular zone, then that particular server is not a multimaster DNS server for that particular zone. If a DNS server is found to be a multimaster DNS server, then the entity desiring to publish to the DNS database may send the update to any multimaster DNS server. Sending the update to only one of the multimaster DNS servers may reduce network update traffic and may also eliminate replication collisions for specific records among the many master servers of a zone.

A host maintains a list of DNS servers associated with each network connection. The test to determine the existence of multimaster DNS servers requires the host to make a preliminary query to at least one DNS server on each list. Each query to each DNS server inquires as to the content of a zone of a DNS database of the DNS server. The zone identifies a domain name and has one or more record sets associated therewith. In the records set is a record type called the Start of Authority ("SOA") type and a record type called the Name Server ("NS") type. The SOA record identifies at least the start of a zone of authority, the name of the zone, and the master or primary name server for that zone. The NS record type identifies a name server for the domain name. Each DNS server may have more than one NS record. This collection of NS records is called the NS record set.

In traditional DNS, a name server is a server program that holds information about the domain tree's structure and set information and has complete information about a subset of the domain space, as well as pointers to other name servers that can be used to lead to information from any part of the domain tree. Name servers are authoritative as to the parts of the domain tree for which they have complete information. Authoritative information is organized into units called zones or zone files. Zones can be automatically distributed to the name servers which provide redundant service for the data in a zone.

In traditional DNS, the NS record set contains one or more names of servers that have complete information for the zone, and also includes the master name server to which updates to the information contained in the zone is permitted to be made. The relevance of the SOA and NS records depends on whether the DNS servers are traditional or multimaster. In traditional DNS, a query to the SOA record of any DNS server will always result in the name of the same master server. This is not true of multimaster DNS where a query to the SOA record of a multimaster DNS server results in the server returning its own name as the master server. Thus, queries for the SOA record from a DNS server in a multimaster zone can produce different names for a master server for the given zone depending on which DNS server is queried.

The information received from the queries to the two or more DNS servers includes an SOA record for each of the servers. The SOA records for each of the servers, respectively, are then compared to determine if any DNS server is a multimaster server with respect to another DNS server. This comparison begins with an analysis of the SOA record for each of the servers. In the analysis, there are four (4) possibilities: (1) Each server returns an SOA record having the same zone name and the same master server name; (2) Each server returns an SOA record having a different zone name and different master server names; (3) Each server returns an SOA record having the same zone name but different master server names; and (4) Each server returns an SOA record having a different zone name, but the same master server name. If the zone names are different as between the SOA record of two different servers, as in cases (2) and (4), then these DNS servers are in different namespaces and cannot be multimaster DNS servers with respect to each other. In case (1), the DNS servers are functioning under traditional DNS because each server returned the same master DNS server. Multimaster servers can exist only in case (3).

When the master name servers are different, as in case (3), each master name server is queried for the NS records for the given zone name. The set of answers are then compared to determine if the master servers are from different namespaces or if they are multimaster servers in the same namespace. If the NS record sets of the servers in case (3) contain each other or partially intersect, then the DNS servers are in the same namespace and are multimaster DNS servers. In other words, if the NS record set of one server contains the name of a name server that is the same as the name of a name server in the NS record set of another server, then the DNS servers are multimaster DNS servers. If the names of the name servers in the NS record sets are exclusive, then these DNS servers are in different namespaces and are not multimaster DNS servers with respect to each other. If names of the name servers in the NS record sets are not exclusive or have overlapping information, then the DNS servers are in the same namespace.

The present invention will determine which networks have multimaster DNS servers and which network connections are actually in the same namespace by using the above method. The present invention will also determine which DNS servers need to be updated with new information.

Once the determination of whether the DNS servers are multimaster DNS servers has been made, the host can then update the DNS servers. The host only needs to send one update to each namespace. Each network that ultimately falls in cases (1), (2) or (4), as defined above, must each receive an update. If one or more networks are described by case (3), an update need only be sent to one of them. This update will reach all the networks in case (3) because they are multimaster DNS servers. In other words, multimaster DNS servers are in the same namespace and only need one update. The host must update all namespaces, rather than send an update over each network connection.

The present invention not only determines whether certain servers are multimaster servers, but also determines how many namespaces the host is within. With this information, the host need only send one update per namespace and in those namespaces where multimaster DNS servers are present, the host may send the update to any one of those servers. In contrast to traditional DNS, the host must sent the update to the primary name server only.

These and other features of the present invention will become more fully apparent from the following description and obtained by means of the instruments and combinations particularly point out in the appended claims, or may be learned by the practice of the invention as set forth hereinafter.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

As used herein, the term "software component" refers to any set of executable instructions separately cognizable to an operating system that manages a computer system. Examples would include separate processes or threads, application programs, system device drivers, and any other-such operating system entity.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specified communications protocol to transmit information from one physical connection to another.

As used herein, the term "Application Programming Interface" (API) is a set of subroutines provided by one software component so that relevant services may be uniformly accessed.

As used herein, the term "messaging" refers to sending uniform message blocks 16 between software components in order to communicate there between. One example would be the I/O Request Packet (IRP) structure used in the Windows NT brand I/O system to communicate between different drivers.

FIG. 1 with the foregoing and the following discussions are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
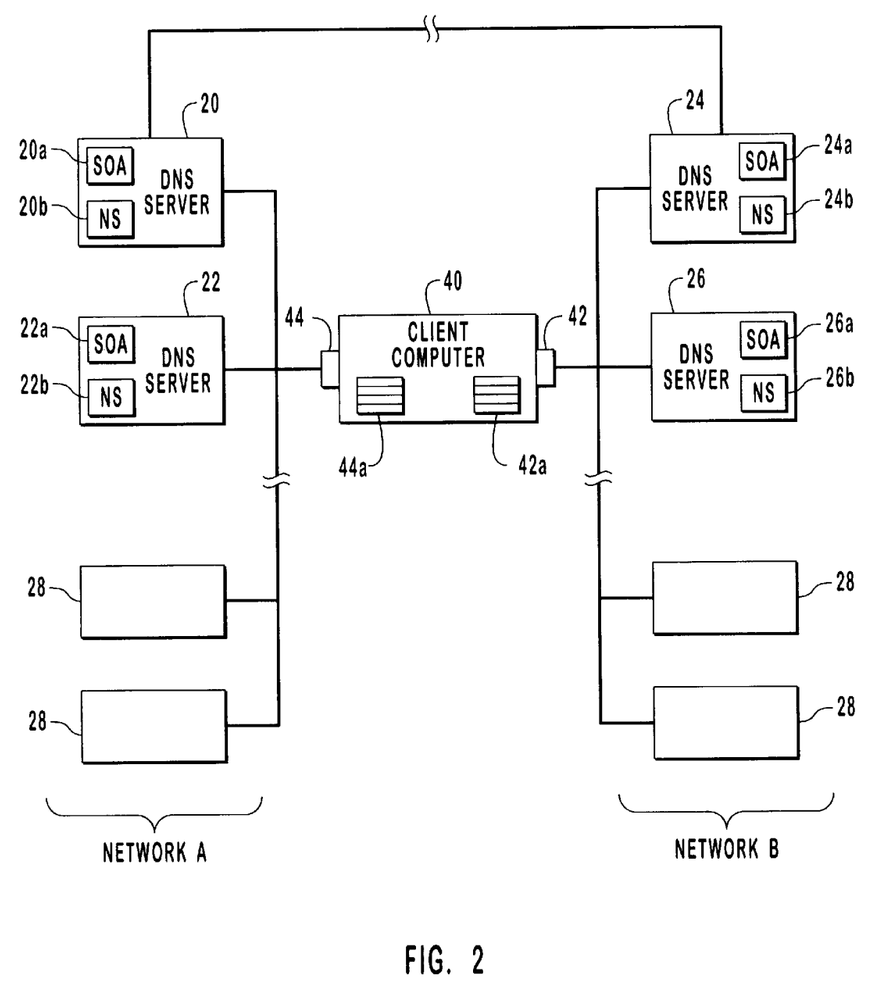
FIG. 2 is an illustration of a host connected to two separate networks and includes a depiction of the SOA record and the NS record set maintained by each DNS server.

A client computer 40 in FIG. 2 is directly connected in a communications network to a Network A via a modem 44 and to a Network B via a LAN connection 42. Network A is a network comprising a DNS server 20, a DNS server 22 and other network connections 28. Network B is a network comprising a DNS server 24, a DNS server 26 and other network connections 28. Network connections 28 can be another host, a client computer, a printer, a modem or any other device capable of connecting to a network. Client computer 40 maintains a list containing the DNS servers for each network to which it is connected. In FIG. 2, client computer 40 maintains a list 44a for network A and a list 42a for network B. List 44a contains DNS server 20 and DNS server 22. List 42a contains DNS server 24 and DNS server 26. Each of the DNS servers 20, 22, 24, and 26 can all function as either a name server or a primary name server in the DNS system. As used herein, references to primary name servers and name servers are intended to represent software components that execute on a server computer.

Each DNS server in a network has two required records: a Start of Authority (SOA) record and a Name Server (NS) record. Each DNS server may have more than one NS record and all the NS records maintained by a particular DNS serve comprise the NS record set. DNS server 20 has SOA record 20a and NS record set 20b. SOA record 20a contains the name of the primary or master name server (PNS) for a particular zone and also contains the name of the particular zone for which the master server is authoritative. The NS record set contains the names of all name servers for a particular zone. Both primary name servers and name servers are authoritative, or maintain complete information as to a particular zone. Only the primary name server is capable of making a change to the DNS database. All name servers may receive an update to the DNS database, but only the master name server can commit the update to the DNS database. The name servers later retrieve the change made to the DNS database by the primary name server from the primary name server.

In order to determine the contents of an SOA record and an NS record set, client computer 40 must make a query by messaging to a DNS server via an initiating software component having various API. For network A in FIG. 2, a query to DNS server 20 and a query to DNS server 22 as to the contents of SOA record 20a and SOA record 22a will result in the same information because there is only one primary name server per zone and every SOA record contains the name of the same primary server. Thus SOA record 20a and SOA record 22a will contain the same primary server name. Assuming that DNS server 20 and DNS server 22 are in the same zone, the query to NS record set 20b and NS record set 22b will also result in the same information being returned to client computer 40. The same is true of network B. A query by client computer 40 to DNS server 24 and DNS server 26 in network B as to the contents of SOA record 24a and SOA record 26a will result in the same information as will queries to NS record set 24b and NS record set 26b.

Figure 3:
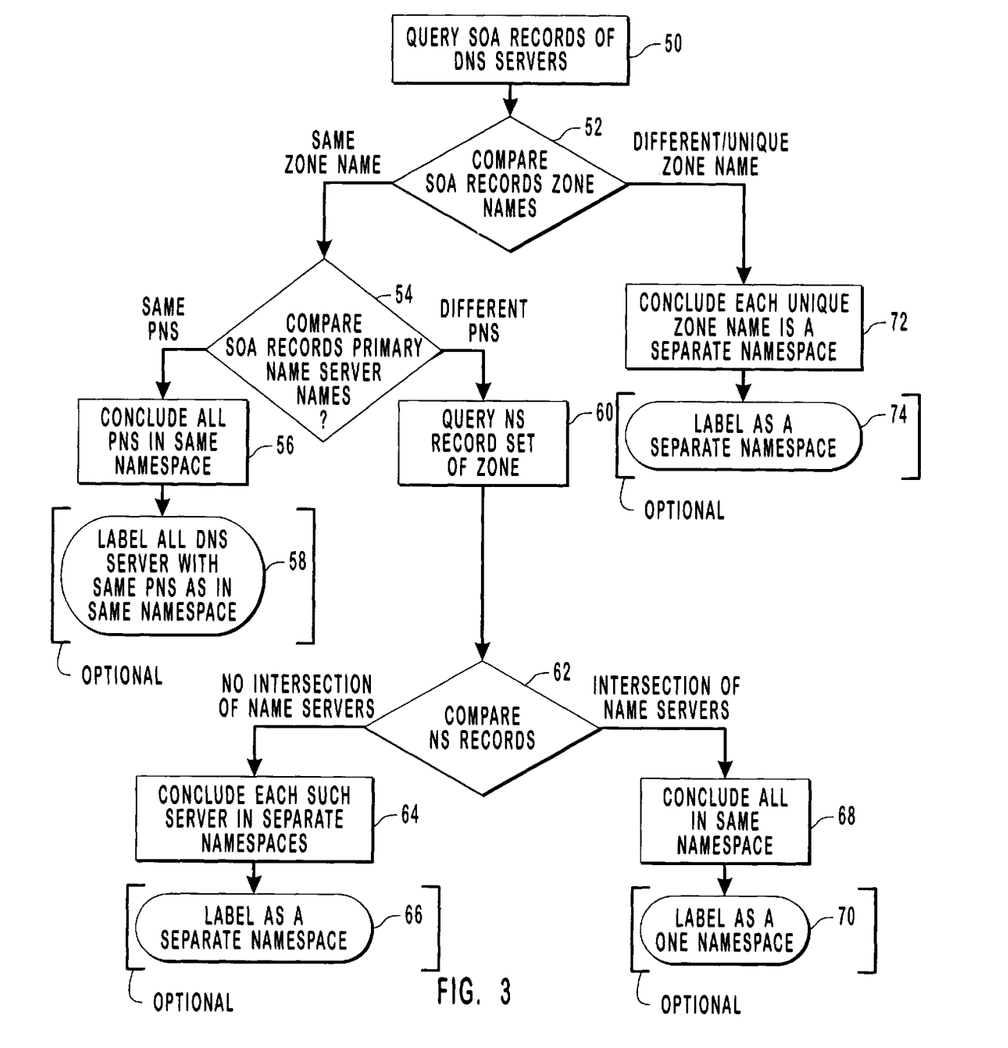
FIG. 3 is a flowchart showing the processing steps taken by a host in determining the number of namespaces to which the host is connected.

Assume that DNS server 20 in network A and DNS server 24 in network B are both name servers for the same domain. In other words, DNS server 20, DNS server 24, DNS server 22, and DNS server 26 all receive their information from the same primary name server. In this case, client computer 40 has two physical connections, one to network A and one to network B. Client computer 40, however, is connected to one namespace. FIG. 3 is an illustration of how client computer 40 can determine how many namespaces comprise the networks connected to client computer 40. Recall from FIG. 2 that each Internet connection maintains a list of associated DNS servers. These lists are illustrated in FIG. 2 as list 44a and list 42a. The DNS servers on list 42a are in the same zone and point to the same primary server. The DNS servers on list 44a are in the same zone and point to the same primary server.

Client computer 40 begins the task of determining how many namespaces exist by querying the SOA record of a DNS server. Applying the flowchart of FIG. 3 to the case of FIG. 2, client computer 40, for network A, will query the SOA record of either DNS server 20 or DNS server 22 because both DNS servers are on list 44a Client computer 40, for network B, will query the SOA record of either DNS server 24 or DNS server 26 because both DNS servers are on list 42a. This is accomplished in FIG. 3 at query 50. Query 50 requests two specific pieces of information from an SOA record: the name of the master or primary server, and the name of the zone for which the primary server is authoritative. Query 50 is done to one DNS server for each list.

In FIG. 2, client computer 40 requests the SOA record from one of DNS server 20 and DNS server 22 and one of DNS server 24 and DNS server 26. Assume for purposes of this example, that client computer 40 queried DNS server 20 and DNS server 24 in query 50. Step 52 compares the names of the respective zones. If the names of the respective zones are different then step 72 concludes that each unique zone name is a separate distinct namespace. Step 74 is an optional step which is not ordinarily performed. Step 74 verifies that a different namespace label is stored in a namespace directory for each name of each zone that is different and if the label information is not found then it is stored.

If the respective zone names are the same then step 54 compares the names of the primary name servers returned by query 50. If the names of the primary name servers are the same, then step 56 concludes that all DNS servers that returned an SOA record with the same zone name and the same primary server name are in the same namespace. Client computer 40 has the option of executing step 58, which verifies that the same namespace label is stored in a namespace directory for each SOA record where the name of each zone is the same and the name of the primary name server is the same and if the label information is not found, then it is stored.

If the names of the primary name servers are different, then query 60 further queries the DNS servers as to the contents of the respective NS record sets. Under FIG. 2, and our assumption stated above, query 60 would go to DNS server 20 and DNS server 24 to obtain the contents of NS record set 20b and NS record set 24b. Step 62 in FIG. 3 compares the contents of each NS record set against the other NS record sets from other DNS servers. In FIG. 3, step 62 compares NS record set 20b of DNS server 20 against NS record set 24b of DNS server 24. NS record set 20b contains a list of DNS servers that are authoritative for the same zone that the primary server is authoritative for. If NS record set 20b of DNS server 20 contains the name of a name server found in NS record set 24b of DNS server 24, then NS record set 20b of DNS server 20 and NS record set 24b of DNS server 24 intersect. If the NS record sets intersect, then step 68 in FIG. 3 concludes that all such DNS servers having: the same zone name, different primary server names, and intersecting NS record sets are in the same namespace. Step 70 is an optional step which is preferably not executed. Step 70 verifies that the same namespace label is stored in a namespace directory for each name of each of the respective zones and if the label information is not found, then it is stored.

If none of the names of the name servers in NS record set 20b of DNS server 20 are the same as any names of name servers in NS record set 24b of DNS server 24, then the NS record sets do not intersect. Step 64 concludes that all such DNS servers are in separate namespaces. Step 66 is an optional step which is not ordinarily performed. Step 66 verifies that a different namespace label is stored in a namespace directory for each name of each such zone and if the label information is not found, then it is stored.

The process illustrated in FIG. 3 can be expanded to include a situation where client computer 40 has a plurality of network connections. Each network connection will have an associated list of DNS servers. One DNS server from each list or network is queried as to the contents of its SOA record and NS record set. All networks associated with a unique zone name are in a different namespace. All networks having the same zone name and the same primary server name are in the same namespace. All networks having the same zone name and different primary server names are further divided by the content of the NS record set. Those networks whose NS record sets intersect are in one namespace. Those networks whose NS record sets do not intersect are all in different namespaces even though they may have the same zone name. When a client computer needs to make an adjustment to a DNS record and make this information available on the various networks, the client computer need only send an update to each namespace. It is not necessary to send an update over each network connection as this would be redundant.

This process can be applied to more than one DNS server and can be used for any distributed database. If the client computer is making an update of general information the client computer, or whatever device is making the update, only need update one namespace.

Figure 4:
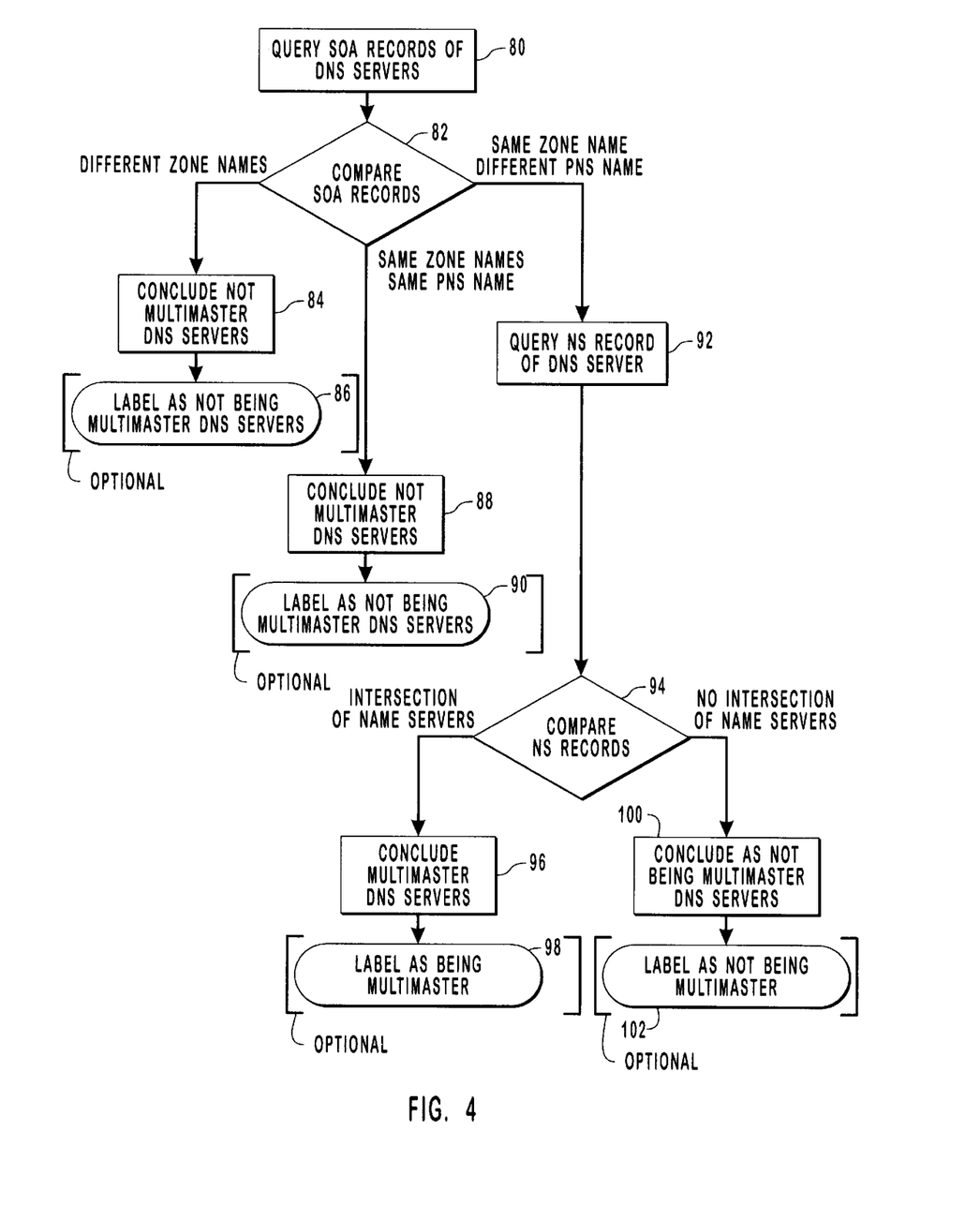
FIG. 4 is a flowchart of the processing steps taken to determine if the DNS servers to which a host is connected are multimaster DNS servers with respect to each other.

FIG. 4 is an illustration of the process for detecting multimaster DNS servers. The system in FIG. 2 will be used to show how the flowchart of FIG. 4 works. Step 80 in FIG. 4 queries the SOA record of one of the DNS servers in network A and one of the DNS servers in network B in FIG. 2. Assume for purposes of this illustration that DNS server 20 was selected for network A and DNS server 24 was selected for network B. Step 80 will query DNS server 20 and DNS server 24 for the respective contents of SOA record 20a and SOA record 24a. Step 82 compares the contents of these SOA records. If SOA record 20a and SOA record 24a contain different or unique zone names, the name of the primary server is not needed and step 84 concludes that, as to each other, DNS server 20 and DNS server 24 are not multimaster DNS servers. Step 86, which is optional and not normally executed, verifies that a non-multimaster designation is stored in a directory for each DNS server within each zone having a name that is the different from the names of the other zones and if the designation is not found, then it is stored. The purpose of the directory is to store and maintain a list of each DNS server and the respective states of each as being either multimastered or non-multimastered.

If step 82 determines that SOA record 20a and SOA record 24a have the same zone name and the same primary server name, step 88 concludes that DNS server 20 and DNS server 24 are not multimaster with respect to each other. Step 90 is optional and is not normally performed. Step 90 verifies that a non-multimaster designation is stored in the directory for each DNS server computer within each zone having a name of a primary server computer that is the same as the name of another primary server computer and if the designations are not found, then they are stored.

If step 82 determines that SOA record 20a and SOA record 24a have the same zone names and different primary server names, then it is necessary to query NS record set 20b of DNS server 20 and NS record set 24b of DNS server 24. This query is performed in step 92. Step 94 compares the contents of NS record set 20b and NS record set 24b. If the contents of the NS record set 20b and NS record set 24b intersect, as defined above, then step 96 concludes that DNS server 20 and DNS server 24 are multimaster DNS servers with respect to each other. Step 98 is optional and is preferably not executed. Step 98 verifies that a multimaster designation is stored in the directory for each DNS server computer within each zone having a name server that is the same as a name of another name server in another NS record and if the designation is not found, then it is stored. If the NS record sets of DNS server 20 and DNS server 24 do not intersect, step 100 concludes that the DNS servers are not multimaster DNS servers with respect to each other. Step 102, which is optional and preferably not executed, verifies that a non-multimaster designation is stored in the directory for each DNS server computer within each zone having a name server that is not the same as a name of another name server in another NS record and if the designation is not found then it is stored.

FIG. 3 and FIG. 4 are representative of methods to detect multiple namespaces and multimaster DNS servers. Each path in the flowcharts of FIG. 3 and FIG. 4 lead to useful results. Useful results are obtained without exhausting every possibility. For example, client computer 40 may need to know if DNS server 20 and DNS server 22 are multimaster DNS servers. Client computer 40 would follow the steps of the flowchart in FIG. 4. Client computer 40 would query SOA record 20a and SOA record 22a in step 80 of FIG. 4. If step 82 concludes that SOA record 20a and SOA record 22a contain the same information, then step 88 concludes that DNS server 20 and DNS server 22 are not multimaster DNS servers. Client computer 40 has a useful result by following only one path of the flowchart. In a similar manner, client computer 40 or any network connection 28 could follow any path in FIG. 3 and FIG. 4 and obtain useful results.

In an environment where there is only one network connection, it is still possible to have multimaster DNS servers. Assume client computer 40 in FIG. 2 was only connected to Network A. In order to determine if DNS server 20 and DNS server 22 are multimaster DNS servers, The respective SOA records and NS record sets must be compared and analyzed. The process of FIG. 4 would be applied to determine if DNS servers in the same zone are multimaster DNS servers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that comprises a client networked to one or more networks, each network having a database that is partitioned into one or more zones and distributed over one or more distributed database servers, at least one distributed database server being an authoritative server in that it maintains complete information as to at least one zone of the distributed database, and at least one authoritative server being a master server in that it is capable of updating the distributed database, and wherein each partition of the distributed database comprises partition information for identifying (i) a zone that corresponds to the partition, (ii) a master server for the zone, and (iii) any authoritative servers for the zone, a method of detecting multiple master servers within a single zone, the method comprising steps for:
   locating a plurality of distributed database servers, each maintaining one or more partitions of one or more distributed databases;
   receiving, from each of the plurality of distributed database servers, partition information for at least one partition of at least one distributed database, whereby a plurality of partition information is received;
   from the plurality of received partition information, identifying a zone that corresponds to each partition and a master server for that zone;
   comparing master servers that are identified in the plurality of received partition information; and
   if the plurality of received partition information identifies only one master server for a particular zone, then concluding that the particular zone has a single master server.

2. The method as defined in claim 1, wherein a client has data to publish into a distributed database, the method further comprising a step for, for each zone having a single master server, sending the data from the client to the single master server for that zone, wherein the single master server for that zone publishes the data into the distributed database.

3. The method as defined in claim 1, wherein the plurality of received partition information comprises first partition information and second partition information, the method further comprising a step for concluding that a first master server identified in the first partition information cannot be a multiple master server with respect to a second master server identified in the second partition information, if the zone identified in the first partition information is different from the zone identified in the second partition information.

4. The method as defined in claim 1, further comprising steps for:
   from the plurality of received partition information, identifying any authoritative servers for a given zone; and
   for the given zone, if the received partition information identifies more than one master servers, and if no authoritative servers are common to the more than one master servers, then concluding that the given zone has a single master server.

5. The method as defined in claim 4, wherein a client has data to publish into a distributed database, the method further comprising a step for, for each zone having a single master server, sending the data from the client to the single master server for that zone, wherein the single master server for that zone publishes the data into the distributed database.

6. The method as defined in claim 1, further comprising steps for:
   from the plurality of received partition information, identifying any authoritative servers for a given zone; and
   for the given zone, if the received partition information identifies more than one master servers, but identifies at least one authoritative server that is common to the more than one master servers, then concluding that the given zone has multiple master servers.

7. The method as defined in claim 6, wherein a client has data to publish into a distributed database, the method further comprising a step for, for each zone having multiple master servers, sending the data from the client to only one master server for that zone, wherein the only one master server for that zone publishes the data into the distributed database.

8. The method as defined in claim 1, wherein the one or more distributed databases comprise a DNS database storing a Start of Authority record containing the name of a DNS zone that corresponds to a DNS partition and the name of a master DNS server for the DNS zone, and storing a Name Server record set representative of the names of any authoritative servers for the DNS zone.

9. In a system that comprises a client networked to one or more networks, each network having a database that is partitioned into one or more zones and distributed over one or more distributed database servers, at least one distributed database server being an authoritative server in that it maintains complete information as to at least one zone of the distributed database, and at least one authoritative server being a master server in that it is capable of updating the distributed database, and wherein each partition of the distributed database comprises partition information for identifying (i) a zone that corresponds to the partition, (ii) a master server for the zone, and (iii) any authoritative servers for the zone, a method of detecting multiple master servers within a single zone, the method comprising steps for:

locating a plurality of distributed database servers, each maintaining one or more partitions of one or more distributed databases;

receiving, from each of the plurality of distributed database servers, partition information for at least one partition of at least one distributed database, whereby a plurality of partition information is received;

from the plurality of received partition information, identifying a zone that corresponds to each partition and a master server for that zone;

comparing master servers that are identified in the plurality of received partition information; and for a particular zone, if the plurality of received partition information identifies more than one master servers, but identifies at least one authoritative server that is common to the more than one master servers, then concluding that the particular zone has multiple master servers.

10. The method as defined in claim 9, wherein a client has data to publish into a distributed database, the method further comprising a step for, for each zone having multiple master servers, sending the data from the client to only one master server for that zone, wherein the only one master server for that zone publishes the data into the distributed database.

11. The method as defined in claim 9, wherein the method further comprises, for the particular zone, if the received partition information identifies only one master server, then concluding that the particular zone has a single master server.

12. The method as defined in claim 11, wherein a client has data to publish into a distributed database, the method further comprising a step for, for each zone having a single master server, sending the data from the client to the single master server for that zone, wherein the single master server for that zone publishes the data into the distributed database.

13. The method as defined in claim 9, wherein the plurality of received partition information comprises first partition information and second partition information, the method further comprising a step for concluding that a first master server identified in the first partition information cannot be a multiple master server with respect to a second master server identified in the second partition information, if the zone identified in the first partition information is different from the zone identified in the second partition information.

14. The method as defined in claim 9, further comprising a step for, for the particular zone, if the received partition information identifies more than one master servers, and if no authoritative servers are common to the more than one master servers, then concluding that the particular zone has a single master server.

15. The method as defined in claim 14, wherein a client has data to publish into a distributed database, the method further comprising a step for, for each zone having a single master server, sending the data from the client to the single master server for that zone, wherein the single master server for that zone publishes the data into the distributed database.

16. The method as defined in claim 9, wherein the one or more distributed databases comprise a DNS database storing a Start of Authority record containing the name of a DNS zone that corresponds to a DNS partition and the name of a master DNS server for the DNS zone, and storing a Name Server record set representative of the names of any authoritative servers for the DNS zone.

17. For a system that comprises a client networked to one or more networks, each network having a database that is partitioned into one or more zones and distributed over one or more distributed database servers, at least one distributed database server being an authoritative server in that it maintains complete information as to at least one zone of the distributed database, and at least one authoritative server being a master server in that it is capable of updating the distributed database, and wherein each partition of the distributed database comprises partition information for identifying (i) a zone that corresponds to the partition, (ii) a master server for the zone, and (iii) any authoritative servers for the zone, a computer program product for implementing a method of detecting multiple master servers within a single zone, comprising:

a computer readable medium for carrying machine-executable instructions that implement the method; and wherein said method is comprised of machine-executable instructions that perform steps for:

locating a plurality of distributed database servers, each maintaining one or more partitions of one or more distributed databases;

receiving, from each of the plurality of distributed database servers, partition information for at least one partition of at least one distributed database, whereby a plurality of partition information is received;

from the plurality of received partition information, identifying a zone that corresponds to each partition and a master server for that zone;

comparing master servers that are identified in the plurality of received partition information; and if the plurality of received partition information identifies only one master server for a particular zone, then concluding that the particular zone has a single master server.

18. The computer program product as defined in claim 17, wherein a client has data to publish into a distributed database, the method further comprising a step for, for each zone having a single master server, sending the data from the client to the single master server for that zone, wherein the single master server for that zone publishes the data into the distributed database.

19. The computer program product as defined in claim 17, wherein the plurality of received partition information comprises first partition information and second partition information, the method further comprising a step for concluding that a first master server identified in the first partition information cannot be a multiple master server with respect to a second master server identified in the second partition information, if the zone identified in the first partition information is different from the zone identified in the second partition information.

20. The computer program product as defined in claim 17, the method further comprising steps for:

from the plurality of received partition information, identifying any authoritative servers for a given zone; and for the given zone, if the received partition information identifies more than one master servers, and if no authoritative servers are common to the more than one master servers, then concluding that the given zone has a single master server.

21. The computer program product as defined in claim 20, wherein a client has data to publish into a distributed database, the method further comprising a step for, for each zone having a single master server, sending the data from the client to the single master server for that zone, wherein the single master server for that zone publishes the data into the distributed database.

22. The computer program product as defined in claim 17, the method further comprising steps for:
  from the plurality of received partition information, identifying any authoritative servers for a given zone; and
  for the given zone, if the received partition information identifies more than one master servers, but identifies at least one authoritative server that is common to the more than one master servers, then concluding that the given zone has multiple master servers.

23. The computer program product as defined in claim 22, wherein a client has data to publish into a distributed database, the method further comprising a step for, for each zone having multiple master servers, sending the data from the client to only one master server for that zone, wherein the only one master server for that zone publishes the data into the distributed database.

24. The computer program product as defined in claim 17, wherein the one or more distributed databases comprise a DNS database storing a Start of Authority record containing the name of a DNS zone that corresponds to a DNS partition and the name of a master DNS server for the DNS zone, and storing a Name Server record set representative of the names of any auhoritative servers for the DNS zone.

25. For a system that comprises a client networked to one or more networks, each network having a database that is partitioned into one or more zones and distributed over one or more distributed database servers, at least one distributed database server being an authoritative server in that it maintains complete information as to at least one zone of the distributed database, and at least one authoritative server being a master server in that it is capable of updating the distributed database, and wherein each partition of the distributed database comprises partition information for identifying (i) a zone that corresponds to the partition, (ii) a master server for the zone, and (iii) any authoritative servers for the zone, a computer program product for implementing a method of detecting multiple master servers within a single zone, comprising:
  a computer readable medium for carrying machine-executable instructions that implement the method; and
  wherein said method is comprised of machine-executable instructions that perform steps for:
    locating a plurality of distributed database servers, each maintaining one or more partitions of one or more distributed databases;
    receiving, from each of the plurality of distributed database servers, partition information for at least one partition of at least one distributed database, whereby a plurality of partition information is received;
    from the plurality of received partition information, identifying a zone that corresponds to each partition and a master server for that zone;
    comparing master servers that are identified in the plurality of received partition information; and
    for a particular zone, if the plurality of received partition information identifies more than one master servers, but identifies at least one authoritative server that is common to the more than one master servers, then concluding that the particular zone has multiple master servers.

26. The computer program product as defined in claim 25, wherein a client has data to publish into a distributed database, the method further comprising a step for, for each zone having multiple master servers, sending the data from the client to only one master server for that zone, wherein the only one master server for that zone publishes the data into the distributed database.

27. The computer program product as defined in claim 25, wherein the method further comprises, for the particular zone, if the received partition information identifies only one master server, then concluding that the particular zone has a single master server.

28. The computer program product as defined in claim 27, wherein a client has data to publish into a distributed database, the method further comprising a step for, for each zone having a single master server, sending the data from the client to the single master server for that zone, wherein the single master server for that zone publishes the data into the distributed database.

29. The computer program product as defined in claim 25, wherein the plurality of received partition information comprises first partition information and second partition information, the method further comprising a step for concluding that a first master server identified in the first partition information cannot be a multiple master server with respect to a second master server identified in the second partition information, if the zone identified in the first partition information is different from the zone identified in the second partition information.

30. The computer program product as defined in claim 25, the method further comprising a step for, for the particular zone, if the received partition information identifies more than one master servers, and if no authoritative servers are common to the more than one master servers, then concluding that the particular zone has a single master server.

31. The computer program product as defined in claim 30, wherein a client has data to publish into a distributed database, the method further comprising a step for, for each zone having a single master server, sending the data from the client to the single master server for that zone, wherein the single master server for that zone publishes the data into the distributed database.

32. The computer program product as defined in claim 25, wherein the one or more distributed databases comprise a DNS database storing a Start of Authority record containing the name of a DNS zone that corresponds to a DNS partition and the name of a master DNS server for the DNS zone, and storing a Name Server record set representative of the names of any authoritative servers for the DNS zone.

33. In a system that comprises a client connected to one or more networks, each network accessing one or more partitions of one or more distributed databases that may be updated by one or more primary servers, a method comprising:
  receiving initial partition information that is associated with one or more partitions of one or more distributed databases maintained by one or more servers;
  from the initial partition information, identifying one or more primary servers that are capable of updating at least one of the one or more partitions;
  examining the initial partition information; and
  if the initial partition information identifies a plurality of primary servers for a single partition, then receiving additional partition information from each of the plurality of primary servers, the additional partition information identifying zero or more additional servers capable of providing at least some form of access to the single partition, and, if the additional partition information from multiple primary servers identifies at least one additional server that is common to the multiple primary servers, then designating the single partition as having multiple primary servers.

34. A method as recited in claim 33, wherein the additional partition information identifies a plurality of additional servers capable of providing at least some form of access to the single partition.

35. A method as recited in claim 33, wherein if the initial partition information identifies only one primary server for the single partition, then designating the single partition as having a single primary server.

36. A method as recited in claim 35, wherein for the single partition, if the additional partition information fails to identify at least one additional server that is common to the multiple primary servers, then designating the single partition as having a single primary server.

37. A method as recited in claim 36, wherein the initial partition information comprises first partition information and second partition information, the method further comprising a step for concluding that a first primary server identified in the first partition information cannot be a multiple primary server with respect to a second primary server identified in the second partition information, if the partition corresponding to the first partition information is different from the partition corresponding to the second partition information.

38. A method as recited in claim 37, wherein a client has data to update a distributed database, the method further comprising, for each partition having a single primary server, sending the data from the client to the single primary server, and, for each partition having multiple primary servers, sending the data from the client to only one primary server for that partition.

* * * * *

UNITED STATES PATENT AND TRADEMARK OFFICE
CERTIFICATE OF CORRECTION

PATENT NO. : 6,381,627 B1
DATED : April 30, 2002
INVENTOR(S) : Stuart Lup-Sing Kwan and Glenn Alexander Curtis It is certified that error appears in the above-identified patent and that said Letters Patent is hereby corrected as shown below:

Column 2,
Line 50, after "WINS database by" change "manually" to -- manual --

Column 6,
Line 14, after "can be used to lead to" please insert -- information --
Line 63, before "published by Information Sciences" please delete the first instance of "published by"

Column 10,
Line 28, after "the host must" change "sent" to -- send --
Line 33, after "particularly" change "point" to -- pointed --

Column 12,
Line 1, after "by a particular DNS" change "serve" to -- server --
Line 56, after "on list 44a" please insert -- . --

Column 14,
Line 33, after "and the respective" change "states" to -- status --

Signed and Sealed this

Twenty-second Day of October, 2002

*Attest:*

JAMES E. ROGAN
*Attesting Officer*      *Director of the United States Patent and Trademark Office*